US012756895B2

(12) United States Patent
LiVoti et al.

(10) Patent No.: US 12,756,895 B2
(45) Date of Patent: *Oct. 6, 2026

(54) USE OF DOPPLER SHIFT AS A BASIS TO DETERMINE AREA OF FOCUS

(71) Applicant: The Nielsen Company (US), LLC, New York, NY (US)

(72) Inventors: John Thomas LiVoti, Clearwater, FL (US); Stanley Wellington Woodruff, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/825,761

(22) Filed: Sep. 5, 2024

(65) Prior Publication Data

US 2024/0430522 A1 Dec. 26, 2024

Related U.S. Application Data

(63) Continuation of application No. 18/148,746, filed on Dec. 30, 2022, now Pat. No. 12,114,042.

(51) Int. Cl.

| | |
|---|---|
| ***H04N 21/442*** | (2011.01) |
| ***G01S 15/58*** | (2006.01) |
| ***G10L 19/018*** | (2013.01) |
| ***H04N 21/439*** | (2011.01) |

(52) U.S. Cl.

CPC ..... *H04N 21/44218* (2013.01); *G01S 15/586* (2013.01); *G10L 19/018* (2013.01); *H04N 21/4394* (2013.01)

(58) Field of Classification Search

CPC .......... H04N 21/44218; H04N 21/4394; G01S 15/586; G10L 19/018

USPC .......... 725/12

See application file for complete search history.

(56) References Cited

U.S. PATENT DOCUMENTS

| | | | | |
|---|---|---|---|---|
| 8,798,923 | B2 * | 8/2014 | Calvarese | G01S 11/14 701/495 |
| 9,204,251 | B1 * | 12/2015 | Mendelson | G01C 21/206 |
| 9,451,406 | B2 * | 9/2016 | Cornaby | H04W 12/037 |
| 10,042,038 | B1 * | 8/2018 | Lord | G10L 25/51 |
| 2005/0190768 | A1 | 9/2005 | Cutler | |
| 2013/0308818 | A1 * | 11/2013 | MacIntosh | H04N 21/44008 382/100 |

(Continued)

*Primary Examiner* — Adil Ocak

(74) *Attorney, Agent, or Firm* — McDonnell Boehnen Hulbert & Berghoff LLP

(57) ABSTRACT

A method system for use of Doppler shift as a basis to detect user focus, such as to detect that a user was attracted to audio media and/or to an associated object. A portable processing device carried by the user receives audio media emitted from an audio source at a fixed location, the audio media having periodic watermarking encoded at a baseline frequency. The portable processing device detects a change in frequency of the periodic watermarking over time, such as the frequency progressing from at least being higher than the baseline frequency to being the baseline frequency for at least a predefined threshold period of time. Based on the detected change in frequency of the periodic watermarking over time, the portable device then provides a report indicating that the user was attracted to the audio media and/or to an object (e.g., a commercial object) collocated with the audio source.

20 Claims, 4 Drawing Sheets

(56) References Cited

U.S. PATENT DOCUMENTS

| | | | | |
|---|---|---|---|---|
| 2014/0344843 | A1* | 11/2014 | Givon | H04N 21/6181 725/14 |
| 2019/0174186 | A1 | 6/2019 | Hao et al. | |

* cited by examiner

USE OF DOPPLER SHIFT AS A BASIS TO DETERMINE AREA OF FOCUS

This is a continuation of U.S. patent application Ser. No. 18/148,746, filed Dec. 30, 2022, the entirety of which is hereby incorporated by reference.

BACKGROUND

Summary

In order to measure how many people are exposed to media content such as radio, television, online, and/or commercial media, a media-monitoring company can arrange for a representative population of users to wear or otherwise carry portable media-monitoring devices designed to detect hidden identification tones embedded in such media content and to log and report their findings. A portable media-monitoring device could take the form of a dedicated metering device that a user may wear or otherwise carry as they move about or could alternatively take the form of general-purpose device, such as a mobile phone, smart watch, headset, or other programmable device that a user may likewise wear or carry as they move about and that may run a metering application. Such a device carried by a given user may conveniently monitor for the presence of identification tones in the user's environment and may report its findings to a centralized ratings server. The ratings server may then use data accumulated from numerous such devices as a basis to generate media-exposure statistics, which may facilitate setting ad pricing, among other benefits.

While such a device may usefully monitor for user exposure to media content, the act of detecting that a user has been exposed to media content does not in and of itself establish that the media content was of any interest to the user. For instance, in a scenario where a user merely walks past a sound speaker that is emitting audio, the user's media-monitoring device may detect the presence of associated identification tones in the user's environment and may report the user's exposure to that media, even though the user's exposure to the media was merely in passing.

Further, in some cases, media content may be emitted from a media source that is at, nearby, and/or otherwise collocated with a particular object, such as a storefront, a multi-media billboard, or another commercial object, among other possibilities, and the media content may include identification tones that correlate with that object. For instance, a storefront may be configured with an outwardly facing sound speaker that plays a commercial jingle or other advertisement audio associated with the store, and that audio could include identification tones that identify or are otherwise correlated with the store. With this arrangement, as a user is in front of the store, the user's portable media-monitoring device may detect the identification tones and responsively report that the user was exposed to that audio and thus to the store.

However, the act of detecting that the user was exposed to media content emitted from a source collocated with an object such as a storefront or other commercial object does not in and of itself establish that the object was of any interest to the user. For instance, in a scenario where the user merely walks past the object (e.g., a user merely walks along a sidewalk in front of and past the example storefront), the user's media-monitoring device may detect the presence of associated identification tones in the user's environment and may report the user's exposure to the audio and thus to the object, even though the user's exposure to the media and to the object was again merely in passing.

The present disclosure provides an advance that may help to evaluate a user's area of focus, such as to evaluate whether the user was attracted to a source of media content and perhaps to a collocated object, rather than or in addition to the user merely being exposed to the media content and/or object in passing.

In accordance with the disclosure, a portable media-monitoring device can evaluate a change in received audio over time, with the level of change indicating whether the user approached a source of the audio and remained stationary for at least a threshold period of time or rather just moved progressively past the source of the audio. In a scenario where the device determines that the user approached the audio source and remained stationary for a threshold period of time, the device may report that the user was attracted to the audio source. Whereas, in a scenario where the device determines that the user progressively moved past the audio source, the device may forgo such reporting.

Further, in a scenario where the audio source is collocated with a particular object, the device's report in response to the device determining that the user approached the audio source and remained stationary for at least a threshold period of time may indicate that the user was attracted to that particular object. For instance, if the audio is emitted from a particular storefront or other commercial object, and if the device detects based on change in the received audio over time that the user approached the audio source and remained stationary for at least a threshold period of time, then the device may report that the user was attracted to that audio source and thus to the particular object. Whereas, if the device determines based on change in the received media over time that the user merely moved progressively past the audio source, then the device may forgo such reporting.

The device's evaluation of change in the received audio over time can take into account the impact of Doppler shift. Doppler shift provides that, as an audio source emits an audio waveform, (i) a listener moving closer to the audio source will receive a compressed version of the waveform, (ii) a listener moving away from the audio source will receive an expanded version of the waveform, and (iii) a listener not moving in relation to the audio source will receive the waveform as emitted. Given this, as a listener is moving closer to the audio source, the audio waveform as received by the listener will have increased audio frequency (tone or pitch) compared with the emitted audio waveform and will have shorter intervals between waveform points as compared with the emitted audio waveform. Further, as a listener is moving away from the audio source, the audio waveform as received by the listener will have decreased audio frequency compared with the emitted audio waveform and will have longer intervals between waveform points as compared with the emitted audio waveform. Whereas, as a listener is staying still in relation to the audio source, the audio waveform as received by the listener will be the audio waveform as emitted. Other factors or variations may come into play as well.

Evaluation of Doppler shift in a given audio waveform may assume advanced knowledge of one or more predefined frequency or time-interval properties of the audio waveform. Given such advanced knowledge, a portable media-monitoring device could detect a progressive change in such frequency and/or time-interval properties of the received audio waveform over time and could use that detected change as a basis to determine whether the device, and thus the user carrying the device, approached the audio source and remained stationary for at least a threshold period of time or rather just moved progressively toward and past the audio source. (Alternatively, without advanced knowledge of such properties, a device may detect one or more such properties and then evaluate change in the detected properties over time, as a basis for this analysis.) Further, where the audio source is collocated with a particular object such as a storefront or other commercial object, this analysis could support a determination as well of whether the device, and thus the user carrying the device, approached the object and remained stationary for at least a threshold period of time or rather just moved progressively past the object.

Conveniently, the identification tones noted above could be embedded with predefined frequency and time-interval properties in the emitted audio, thus providing baseline reference points for this Doppler-shift analysis while also conveying media-identification information. For instance, the identification tones could be modulated on a predefined audio frequency (ideally out of the predefined range of human hearing) that could serve as a baseline audio frequency for the Doppler-shift analysis, and the identification tones could be provided periodically, with a predefined time interval between successive identification tones that could serve as a baseline time interval for the Doppler-shift analysis.

As a portable-media monitoring device receives such audio (e.g., as the device generally receives environmental audio including the audio at issue), the device may conveniently evaluate the audio frequency and/or time intervals of the identification tones in that audio over time, and may use that evaluation as a basis to determine whether the device approached the audio source and then remained stationary for a threshold period of time, or rather whether the device just moved progressively past the audio source. Further, the device may also determine an identity of the audio, and/or of a collocated object, from one or more such identification tones. In a scenario where the device determines that device approached the audio source and then remained stationary for a threshold period of time, the device may respond to that determination by logging and providing an output indicating that an area of focus of the user corresponds with a location of the audio source or otherwise that the user was attracted to the audio source. Further, where the audio source is collocated with an object, such as a storefront or other commercial object for instance, the device's output could indicate expressly or by correlation that the user was attracted to that object.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

The present description will discuss example implementation in connection with audio that includes periodic watermarking such as but not limited to the identification tones noted above, which could identify the audio, the audio source, and/or a collocated object such as a storefront or other commercial object for instance. It should be understood, however, that the disclosed principles could extend to apply in other scenarios as well, such as with other forms of media, other forms of watermarking, and other types of associated objects if any, among other possibilities.

More generally, it should be understood that various arrangements and processes described herein can take other forms. For instance, elements and operations can be reordered, distributed, replicated, combined, omitted, added, or otherwise modified. Further, it should be understood that functions described herein as being carried out by one or more entities could be implemented by and/or on behalf of those entities, through hardware, firmware, and/or software, such as by one or more processing units executing program instructions or the like.

Figure 1:
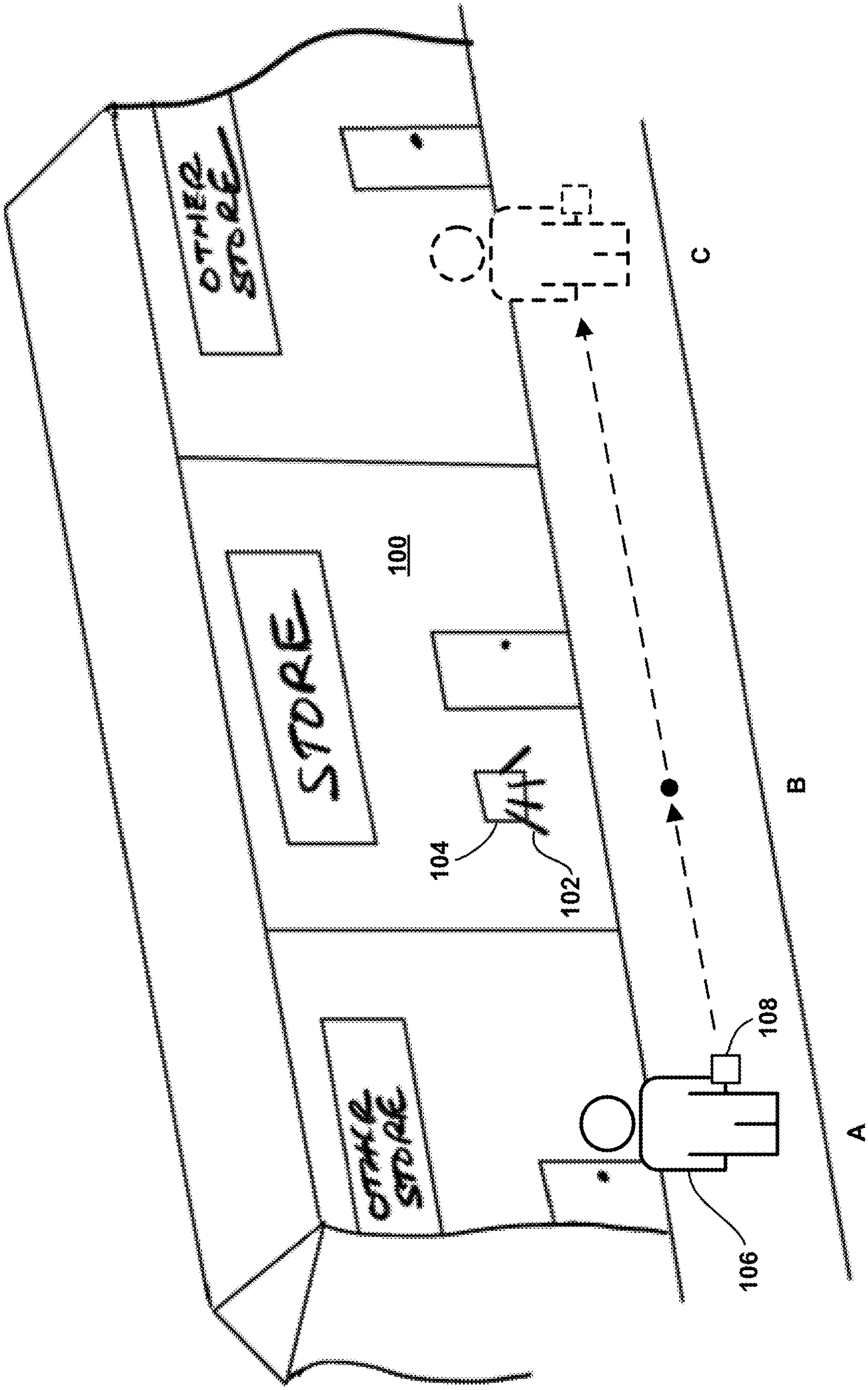
FIG. 1 is a simplified illustration of an example scenario in which various disclosed principles can be implemented.

Referring to the drawings, as noted above, FIG. 1 is a simplified illustration of an example scenario where the disclosed principles could be implemented. Namely, FIG. 1 illustrates an example shopping strip having a series of storefronts shown as separate stores, with a representative store 100 emitting audio 102 from a sound speaker 104 near its front door.

In line with the example discussed above, this audio 102 emitted by this speaker may be a commercial jingle associated with the store 100. Alternatively, the audio 102 could take other forms, possibly being commercially unrelated to the store. For instance, the audio 102 may be an audio feed from a radio, television, and/or streaming media player, among other possibilities.

Further, the audio 102 may be largely within the normal frequency range of human hearing (e.g., in the 20 Hz to 20 kHz range), so that a person who is at or near the store 100 may hear the audio 102. Alternatively, the audio 102 may be wholly outside the normal frequency range of human hearing and therefore generally inaudible to humans—which may facilitate carrying out the present process without having a user hear the audio. Other examples are possible as well.

As discussed above, the audio 102 may be periodically watermarked with data that may indicate identification of the audio media and/or, in the illustrated example, identification of the store 100 from which the audio media is being emitted, among other possibilities. In an example implementation, a content-creator, broadcaster, media player, and/or other provider of the audio 102 may embed, encode, and/or otherwise provide this watermarking in the audio 102, so that the audio 102 as emitted would include the watermarking.

An example process for watermarking of data into audio 102 could be done in the analog or digital domain and could involve modulating the data onto a particular audio frequency (i.e., tone) and adding the resulting modulated audio frequency to the audio. For instance, to watermark the bit sequence 01101010 in the audio media (i.e., to add into the audio media a watermark that encodes or otherwise represents the bit sequence), a computing system could modulate onto a particular audio frequency a waveform that represents that bit sequence and then add the resulting modulated audio frequency into the audio media. As a result, a representative watermark could be included in the audio media on a representative audio frequency and could thus be considered to be at that audio frequency.

Optimally, this audio watermarking could be done at an audio frequency that is outside of the normal frequency range of human hearing. For instance, the watermarking could be done at an audio frequency in the 2 MHz to 4 MHz range, among other possibilities. Watermarking the data at an audio frequency outside of the human hearing range could help avoid having a user hear the audio representation of the watermarking. This may be especially important if the audio 102 is generally human audible, such as music, an audio soundtrack, or the like. However, it could be important in other situations too.

As noted, the data watermarked into the audio 102 may indicate an identification of the audio 102 and/or, in the present example, an identification of the store 100, among other possibilities. For example, if the audio 102 is a song, the data watermarked into the audio 102 may indicate the name of the song. As another example, if the audio 102 is an audio soundtrack of a television program, the data watermarked into the audio 102 may indicate the name of the television program. And as yet another example, if the store 100 has a particular name or brand, the data watermarked into the audio 102 may indicate that name or brand. The data may itself specify this identification, or the data may be a code that correlates with the identification, such that an entity presented with the code (e.g., an entity that reads the code from the audio 102 or receives a report of the code read from the audio 102) could determine the identification by performing a database lookup or the like.

Further, as noted, this watermarking of the data in the audio 102 could be periodic. Namely, the watermarking of the data could be repeated periodically in the audio 102, i.e., with a predefined periodicity and thus a predefined time interval between successive instances of the watermarking. For instance, the data could be watermarked into the audio 102 every second, every two seconds, or every four seconds or so, among other possibilities. Watermarking the data into the audio 102 more frequently (i.e., with a shorter time-interval between instances) may facilitate more granular evaluation of the watermarks for purposes of gauging user exposure and/or user attraction to the audio 102 and/or to the store 100.

In an alternative implementation, the watermarked audio 102 could be just the periodic watermarking, i.e., without any other media content. For instance, a computing system could create the audio 102 by simply generating an audio stream that merely consists of periodic instances of identification data or other data modulated onto a predefined audio frequency with predefined periodicity. And as noted above, this signal may be inaudible to humans, to facilitate detecting user exposure and attraction without human hearing of the audio 102.

FIG. 1 further illustrates an example user 106 moving along a sidewalk or other pathway in front of the example shopping strip. Namely, the figure illustrates a path of movement of the user 106 by a dashed line with arrows, showing that the user moves from being at a point A to the left of store 100 to being at a point B in front of the store 100 to being at a point C to the right of the store 100. In various examples, the user 106 may walk or run along this path or may ride a vehicle, such as a bicycle, skateboard, scooter, or wheelchair, along this path. In other examples, the user 106 may ride in a car or other such vehicle along a roadway in front of the shopping strip, among other possibilities. Further, in still other examples, the user's path of movement may not be along a defined pathway.

As further shown, the example user 106 carries a portable media-monitoring device 108. For simplicity, the user 106 is shown carrying this device 108 in the user's hand. In practice, however, the user 106 may carry the device 108 in other ways, such as by having the device 108 be clipped to the user's clothing or within a pocket of the user's clothing, worn on a neck strap, or carried in a bag or other accessory, among other possibilities. Optimally, the device 108 would be positioned in a manner that enables the device to receive audio from the user's surrounding environment, including for instance the audio 102 emitted from the store 100.

Figure 2:
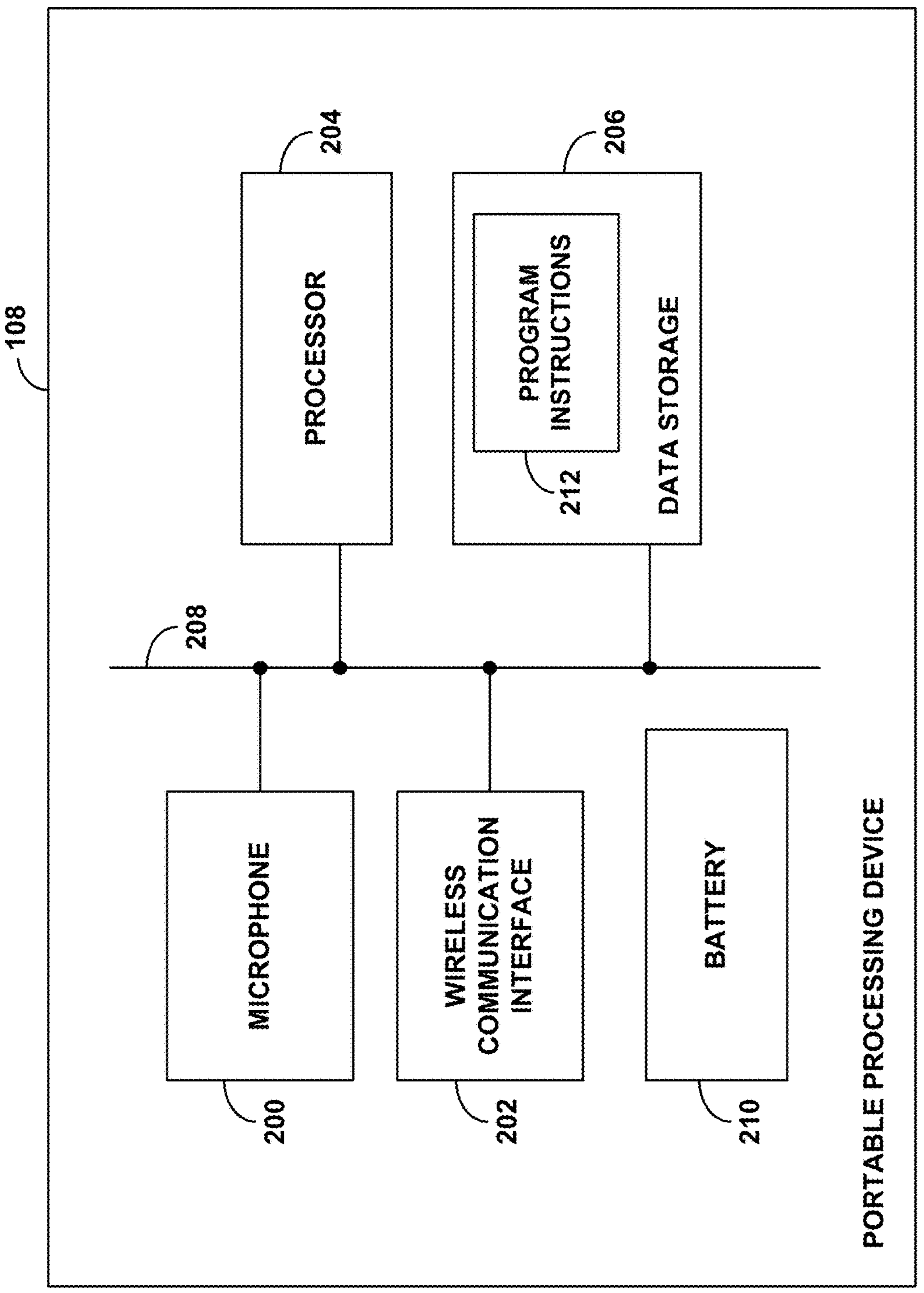
FIG. 2 is a simplified block diagram of an example device that may implement various disclosed principles.

FIG. 2 is a simplified block diagram showing some of the components that could be included in an example of the device 108 to facilitate various disclosed features. As shown, the example device 108 includes a microphone 200, a wireless communication interface 202, a processor 204, and non-transitory data storage 206, all of which could be interconnected by a system bus or other connection mechanism 208. As further shown, the example device 108 also includes a battery 210, for supplying power to drive its various other components.

The microphone 200 could comprise an electret condenser or a digital MEMS microphone, and/or an array of such microphones, among other possibilities. The microphone 200 could be configure to receive acoustic audio from a surrounding environment and to provide a digital audio signal for processing by the device 108.

The wireless communication interface 202 could comprise a cellular communication interface that facilitates wireless wide area network (WWAN) communication according to a cellular air-interface protocol such as Fourth Generation Long Term Evolution (4G LTE), Fifth Generation New Radio (5G NR), and/or other protocols, and/or could comprise a wireless local area network (WLAN) interface such as a WiFi interface or the like that facilitates network communication when in coverage of a WLAN, among other possibilities.

The processor 204 could comprise one or more general purpose processors (e.g., microprocessors, etc.) and/or one or more specialized processors (e.g., application specific integrated circuits (ASIC), etc.), configured to process received audio and to carry out associated operations. For instance, the processor 204 could include a specialized ASIC designed specifically to carry out such operations and/or a digital signal processor (DSP) or other processor programmed to carry out such operations.

The data storage 206 may then comprise one or more volatile and/or nonvolatile storage components (such as magnetic, optical, flash, ROM, RAM, EPROM, EEPROM, and/or other components), possibly integrated with the processor 204. As shown, the data storage 206 may hold program instructions 212, which could be executable by the processor 204 to cause the processor 204 to carry out various operations described herein. For instance, these operations could include processing received audio to monitor for the presence of watermarking such as that discussed above, evaluating a change in the received audio over time, such as change in frequency of detected watermarking over time, and logging and reporting the evaluation results.

Note also that some of these operations could be carried out instead by a network server or other system with which the device 108 interacts. For instance, the device 108 may report to such a system, via the communication interface 202, raw findings such as data that the device reads from watermarking in the received audio and timestamps or other timing of the watermarking, and the system may use that information as a basis to detect that the received audio represents the device being exposed to particular media content and/or to an particular associated object.

In an example implementation, the portable media-monitoring device 108 could be registered as being associated with the user 106, so that reports and/or conclusions that the device 108 was exposed to certain media may effectively indicate that the user 106 was exposed to that media, and/or reports and/or conclusions based on the presently disclosed analysis that the device was attracted to a given media source and/or associated object may effectively indicate that the user 106 was attracted to that media and/or object. For instance, a media-monitoring company may supply the user 106 with the device 108 and record in a data store that the device 108 will be carried by and thus associated with that user 106. Alternatively or additionally, an association between the device 108 and the user 106 could be established through an online configuration interface or in other ways. Further, an identity of the user 106 associated with the device 108 may also be stored in the device 108.

As the user 106 moves about, such as walking along the path described above, the device 108 may monitor for the presence of audio watermarking in the surrounding environment.

To facilitate this as discussed above, the device 108 may be programmed or otherwise provisioned with information indicating the predefined audio frequency at which the watermarking would be included in representative audio, and information indicating the predefined periodicity at which the watermarking would be included in the representative audio. In practice, a provider of the device 108 (e.g., the media-monitoring company noted above) may coordinate with the provider of the audio to arrange for the watermarking to be provided at a given audio frequency and with a given periodicity and may configure the device 108 with these properties, so that the device can then scan for the presence of audio watermarking having such audio frequency and periodicity in its environment.

Also to facilitate this, the watermarking could have a predefined structure, and the device 108 may be programmed or otherwise provisioned with information indicating that structure. For instance, each instance of watermarking may have a predefined bit-string or other preamble that establishes that what follows the preamble in the audio is a bit string or other representation of data. The provider of the device 108 may also coordinate with the provider of the audio to arrange for the watermarking to have this structure and may configure the device 108 with this information as well, so that the device 108 can scan for the presence of audio watermarking having such structure in its environment.

In an example implementation, as the device 108 receives audio from its environment, the device 108 may thus scan for such audio watermarking by evaluating the received audio in search of watermarking having the predefined structure at the predefined audio frequency. Further, upon finding such watermarking, the device 108 may then continue scanning and find additional instances of the watermarking having the predefined periodicity, i.e., the predefined time interval between instances. Upon finding such watermarking in the audio, the device 108 may log its detecting of the watermarking. For instance, the device 108 may read the data from the watermarking and record in its data storage 206 a record of the read data along with timestamps indicating the timing of instances of the device 108 having detected the watermarking.

Based on having detected such watermarking in its environment, the device 108 may output an associated report. For instance, the device 108 may generate and transmit, via its wireless communication interface 202, to a central ratings server or other system, a report that informs the system of the data that the device detected audio watermarked in its environment.

This report output by the device 108 may directly or indirectly indicate that the user 106 was exposed to particular audio and/or to an associated object. For instance, in the example scenario where the audio 102 being emitted from the store 100 is watermarked with data that identifies the audio 102 and/or the store 100, and where the user 106 moves near enough to the store 100 that the device 108 receives that audio 102 and detects the watermarking in that audio 102, the report that the device 108 outputs could specify the watermarked data that the device 108 detected, a time of the detecting, and perhaps an identity of the user 106 of the device 108. Alternatively, the report may just indicate specify the watermarked data and perhaps the timing, and a central system that receives the report may correlate the device 108 with the user 106. In either case, the report could thereby indicate that the device 108 was exposed to the audio 102 and/or the store 100, and/or the report could thereby indicate that the associated user 106 was exposed to the audio 102 and/or to the store 100.

Such a report could be used as a basis to trigger further action. For instance, based on receiving numerous such reports indicating that many users were exposed to the audio 102, a media-monitoring company or other entity may set advertising rates for placing advertising in that audio. As another example, based on receiving relatively few such reports indicating that users were exposed to the store 100, the store may take other action in response to help better promote its goods or services. Other examples may be possible as well.

As noted above, the present disclosure further provides for taking into account Doppler shift as a basis to determine whether a device and thus its user was attracted to an audio source and/or an associated object. In particular, as explained above, an evaluation of change in frequency of a received audio signal over time may facilitate determining whether the device approached the audio source and then remained stationary for at least a threshold period of time or rather whether the device just moved progressively past the audio source. A conclusion from this analysis that the device approached the audio source and them remained stationary for at least a threshold period of time may support a conclusion that the device, and thus its carrying user, was attracted to the audio source. Whereas, a conclusion from this analysis that the device just moved progressively past the audio source may support a conclusion that the device, and thus its carrying user, was not attracted to the audio source.

Referring again to FIG. 1, at issue could thus be whether the user 106 moves from position A toward position B and then remains stationary for at least threshold period of time before moving along to position C. Further, in this analysis, position B may be directly in front of the speaker 104 that is emitting the audio 102 or may be a bit before or after the speaker. If the user 106 moves from position A to position B and then remains stationary for at least a threshold period of time before moving along to position C, then a reasonable conclusion may be that the user 106 was attracted to something around position B, in this case possibly the audio 102 being emitted from the speaker 104 and/or possibly the store 100. Whereas, if the user moves 106 from position A to position C, progressing past position B without remaining stationary at position B for at least the threshold period of time, then a reasonable conclusion may be that the user 106 was not attracted to anything around position B, as the user was just passing by.

To perform this analysis in an example implementation, the device 108 may scan for and detect the audio watermarking as described above. However, the device 108 may further detect a change in frequency of the audio watermarking over time, such as change in audio frequency of the watermarking over time and/or a change of time interval between successive instances of watermarking over time. The device 108 may then record not only the watermarked data that the device 108 read from the audio but also the change in frequency of that watermarking over time.

The device 108 can detect a change in audio frequency of given audio watermarking over time in various ways. As one example, the device 108 may conduct its watermark scanning across a range of audio frequencies centered on the predefined audio frequency on which the device 108 is provisioned to expect the audio watermarking to appear. For instance, if the audio 102 is watermarked at 4 MHz, the device 108 may scan for the watermarking in the received audio 102 at frequencies in the range 3.5 MHz to 4.5 MHz, among other possibilities. Further, to simplify this analysis, the device 108 may perform a fast Fourier transform on the received audio to identify frequency components containing threshold energy, and the device 108 may then focus its analysis on those determined frequency components.

Through this scanning, if the device 108 detects that each of one or more instances of the watermarking in the received audio 102 is at an audio frequency higher than the baseline expected audio frequency where the watermarking was done, then the device 108 may reasonably conclude that the device 108, and thus its carrying user, was at that time moving toward the source of the audio, here the speaker 104 and thus the store 100. Whereas, if the device 108 detects that each of one or more instances of the watermarking in the received audio 102 is at an audio frequency lower than the baseline expected audio frequency, then the device 108 may reasonably conclude that the device 108, and thus its carrying user, was at that time moving away from the audio source. On the other hand, if the device 108 detects that each of one or more instances of the watermarking in the received audio 102 is at or near the baseline expected audio frequency, then the device 108 may reasonably conclude that the device 108, and thus its carrying user, was at the time largely stationary in relation to the location of the audio source.

By recording a timestamp respectively of each detected instance of such watermarking, the device 108 can thereby determine by consideration of those timestamps roughly how long the device 108 was approaching the audio source, how long the device 108 then possibly remained stationary in relation to the location of the audio source, and how long the device 108 was moving away from the audio source. The device may thus record and output a report of such findings, as an indication of whether the device and/or its user was attracted to the audio source and/or a collocated object, here the store 100.

The device 108 can also or alternatively detect in various ways a change in periodicity of the audio watermarking over time, i.e., a change in how frequently the device detected the audio watermarking in the audio 102. To begin with, the device 108 may conduct its watermark scanning with more granular or liberal time constraints. For instance, if the audio is watermarked every 4 seconds, the device 108 may scan for each next instance of the audio watermarking more frequently, such as every second, or from 3 to 5 seconds after a last instance of detecting the audio watermarking.

Further, each time the device 108 detects an instance of the audio watermarking, the device could record an associated timestamp of that instance. The device can then determine the difference in time between successive such instances as a time interval between watermark instances, and the device can compare each of those determined time intervals with a baseline expected time interval between watermark instances. Through this process, if device 108 detects that each of one or more such determined time intervals is shorter than the baseline time interval, the device 108 may reasonably conclude that the device 108, and thus its carrying user, was at that time moving toward the source of the audio, here the speaker 104 and thus toward the store 100. Whereas, if the device 108 detects that each of one or more such determined time intervals is longer than the baseline expected time interval, then the device 108 may reasonably conclude that the device 108, and thus its carrying user, was at that time moving away from the audio source. On the other hand, if the device 108 detects that each of one or more such determined time intervals is equal to or nearly equal to the baseline expected time interval, then the device 108 may reasonably conclude that the device 108, and thus its carrying user, was at the time largely stationary in relation to the location of the audio source.

Based on the timestamps of the detected instances of watermarking, the device 108 may similarly determine roughly how long the device 108 was approaching the audio source, how long the device 108 then possibly remained stationary in relation to the location of the audio source, and how long the device 108 was moving away from the audio source. Further, the device may similarly record and output a report of such findings, as an indication of whether the device and/or its user was attracted to the audio source and/or a collocated object, here the store 100.

Alternatively, as noted above, the device 108 may report its raw findings to a separate computing system, and that computing system may analyze the detected watermarking audio frequencies and/or time intervals to determine a change in watermarking audio frequency and/or time interval over time and thus to conclude whether the device 108, and thus its carrying user 106, was attracted to the audio source and/or collocated object. In this case, as noted above, the report output by the device 108 may still be considered to indicate whether the device and/or user was so attracted to the audio source and/or collocated object by including data that supports such an determination.

Figure 3:
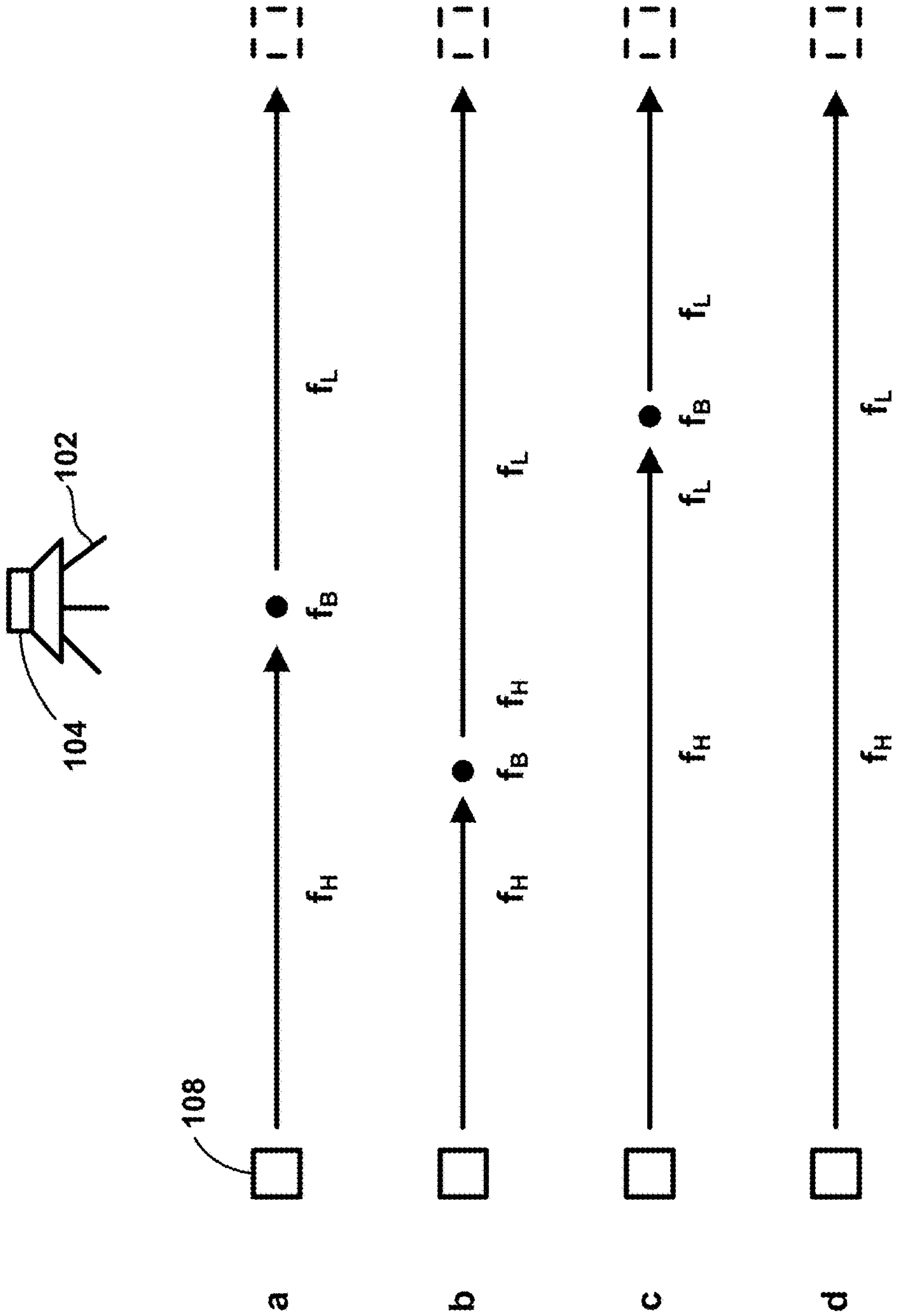
FIG. 3 is a simplified diagram illustrating example movements of a device in relation to an audio source.

FIG. 3 is a diagram that helps to illustrate how change in audio frequency of detected watermarks could support a conclusion of whether the device 108, and thus its detected user, was attracted to the audio source and/or a collocated object such as the store 100. In particular, FIG. 3 shows four example movements (a, b, c, and d) of the device 108 past the sound speaker 104 that is emitting the audio 102. The first three example movements (a, b, and c) show the device 108 moving from being well to the left of the audio source to being near the audio source, the device stopping near the audio source where illustrated by a dot, and the device then moving along well to the right of the audio source. Whereas, the last example movement (d) shows the device 108 moving continuously from left to right past the audio source without stopping.

In example movement a, the device 108 stops at a point that is largely in line with the audio source before then moving along to the right. In this situation, as the device 108 is moving from being well left of the audio source to being largely in line with the audio source, the device 108 may detect that the audio frequency of the watermarking in the audio 102 is higher than the baseline expected audio frequency of the watermarking, due to the device 108 moving toward the audio source (i.e., along a path that brings the device 108 closer to the audio source, even if offset from the audio source). Namely, the device may detect that the audio frequency of the watermarking that the device 108 detects while so moving is $f_H$, meaning that it is higher than the baseline expected audio frequency.

In turn, when the device 108 is stopped in line with the audio source, the device 108 may detect that the audio watermarking in the audio 102 is largely equal to the baseline expected audio frequency, since the device is stationary in relation to the location of the audio source. Namely, the device may detect that the audio frequency of the watermarking that the device 108 detects while still is $f_B$, the baseline expected audio frequency.

Then when the device 108 proceeds to move to the right, the device 108 may detect that the audio watermarking in the audio 102 is lower than the baseline expected audio frequency of the watermarking, due to the device 108 moving away from the audio source (i.e., along a path that brings the device 108 farther from the audio source, also even if offset from the audio source). Namely, the device may detect that the audio frequency of the watermarking that the device 108 detects while so moving is $f_L$, meaning that it is lower than the baseline expected audio frequency.

With the analysis discussed above, if the device 108 detects this sequence of the watermarking audio frequency and determines that audio frequency was largely $f_B$ for at least a threshold period of time deemed to be sufficient to indicate that the device and thus its carrying user was stationary and in line with the audio source for long enough to suggest attraction to the audio source or a collocated object such as store 100, the device 108 may record that and report that fact as noted above. Alternatively, the device may report its raw findings, and another system may derive that fact from those findings.

Movement b is similar to movement a, except that in movement b, the device 108 stops somewhat short of being in line with the audio source. In this situation, the device 108 may detect the audio frequency of watermarking progressively from $f_H$ to $f_B$ to $f_H$ again and then to $f_L$. Namely, in this situation, the detected audio frequency of the watermarking would be higher than the baseline expected audio frequency as the device 108 approaches the point where it stops moving. Then the detected audio frequency would be the baseline expected audio frequency while the device 108 is so stopped. And then as the device 108 starts moving rightward again, the detected audio frequency would again be higher than the baseline audio frequency as the device 108 reaches a point where it is in line with the audio source and would then become lower than the baseline audio frequency as the device 108 then continues to move rightward and farther away from the audio source. (There may of course also be other intervening levels of audio frequency in this or other scenarios.)

Here, if the device similarly detects this sequence of the watermarking audio frequency and determines that audio frequency was largely $f_B$ for at least a threshold period of time deemed to be sufficient to indicate that the device and thus its carrying user was stationary, the device 108 may conclude that the device 108 and thus its carrying user was attracted to the audio source and/or collocated object and may similarly report its findings or raw data indicating such attraction.

Further, in this scenario, to help ensure that the device 108 and thus the user 106 stopped close enough to the audio source to suggest attraction, the analysis may additionally take into account how long the audio frequency of the watermarking was higher than the baseline audio frequency after being at the baseline audio frequency. For instance, the device 108 could further determine if the audio frequency of the watermarking was then at $f_H$ for no more than a predefined threshold short period before then transitioning to be at $f_L$, i.e., before the device 108 then started moving farther away from the audio source. If the device 108 determines this in addition, then the device 108 may reasonably conclude, record, and report that the device, and thus its carrying user, was attracted to the audio source and/or the collocated object. Whereas, if not, then the device 108 may forgo such reporting.

Movement c is similar to movement b, except that in movement c, the device 108 stops somewhat after being in line with the audio source. In this situation, the device 108 may detect the audio frequency of watermarking progressively from $f_H$ to $f_L$ to $f_B$ and then to $f_L$ again. Namely, in this situation, the detected audio frequency of the watermarking would be higher than the baseline expected audio frequency until the device 108 is in line with the audio source and would then be lower than the baseline audio frequency as the device 108 approaches the point where it stops moving. Then the detected audio frequency would be the baseline expected audio frequency while the device 108 is so stopped. And then as the device 108 starts moving rightward again, the detected audio frequency would again be lower than the baseline audio frequency.

Here, if the device similarly detects this sequence of the watermarking audio frequency and determines that audio frequency was largely $f_B$ for at least a threshold period of time deemed to be sufficient to indicate that the device and thus its carrying user was stationary, the device 108 may conclude that the device 108 and thus its carrying user was attracted to the audio source and/or collocated object and may similarly report its findings or raw data indicating such attraction.

Further, analogously in this scenario, to help ensure that the device 108 and thus the user 106 stopped close enough to the audio source to suggest attraction, the analysis may additionally take into account how long the audio frequency of the watermarking was lower than the baseline audio frequency before being at the baseline audio frequency. For instance, the device 108 could further determine if the audio frequency of the watermarking was then at $f_L$ for no more than a predefined threshold short period before then transitioning to be at $f_B$, i.e., before the device 108 then stopped moving. If the device 108 determines this in addition, then the device may reasonably conclude, record, and report that the device 108, and thus its carrying user, was attracted to the audio source and/or the collocated object. Whereas, if not, then the device 108 may forgo such reporting.

Movement d, on the other hand, shows the device 108 moving progressively past the audio source without stopping as noted above. In this scenario, as the device 108 approaches being in line with the audio source, the audio frequency of watermarking detected by the device 108 may be $f_H$, i.e., higher than the baseline expected audio frequency, and as the device 108 then continues along rightward, the audio frequency of watermarking detected by the device 108 may be $f_L$, i.e., lower than the baseline expected audio frequency. Further, the device may not detect the audio frequency being the baseline expected audio frequency $f_B$ at all between these higher and lower audio frequencies or may not detect the audio frequency being at that baseline level for at least a threshold time period deemed to be sufficient to indicate that the device and thus its carrying user was stationary, the device 108 may conclude that the device 108 and thus its carrying user was attracted to the audio source and/or collocated object. Therefore, in this situation, the device may forgo reporting that the device, and thus its carrying user, was attracted the audio source and/or collocated object.

A similar analysis could be done with respect to time intervals as discussed above. For instance, with movement a, the device may detect that the time intervals between successive detected watermarks were shorter than a baseline expected time interval, were then at the baseline time interval for at least a threshold period of time, and were then longer than the baseline time interval, and so forth for movements b and c. Whereas, for movement d, the device may detect that the time intervals were shorter than the baseline time interval and were then longer than the baseline time interval, without being the baseline interval for at least the threshold period of time. These findings could thus support similar recording and reporting as described above.

Note that other patterns of change in frequency and/or time interval may support a similar Doppler-shift analysis, as a basis to evaluate whether a device and thus its carrying user was attracted to the audio source and/or a collocated object.

For instance, the device 108 may determine just that the audio frequency of the watermarking progressed from being higher than the baseline frequency to being the baseline frequency for at least a predefined threshold period of time, without needing to determine as well that that the progression continued with the frequency being lower than the baseline frequency. This analysis may establish that the device, and thus its carrying user, approached the audio source and collocated object and stayed still for at least a predefined threshold period of time, and the device may similarly respond to this by logging and reporting that the device and/or user was attracted to the audio source and/or collocated object.

Likewise, the device may determine just that the time intervals between successive watermarks progressed from being shorter than the baseline time interval to being the baseline time interval for a least a predefined threshold period of time, without needing to determine as well that the progression continued with the time intervals between watermarks being longer than the baseline time interval. This analysis as well may establish that the device, and thus its user, approached the audio source and collocated object and stayed still for at least a predefined threshold period of time, and the device may similarly respond to this by logging and reporting that the device and/or user was attracted to the audio source and/or collocated object.

Figure 4:
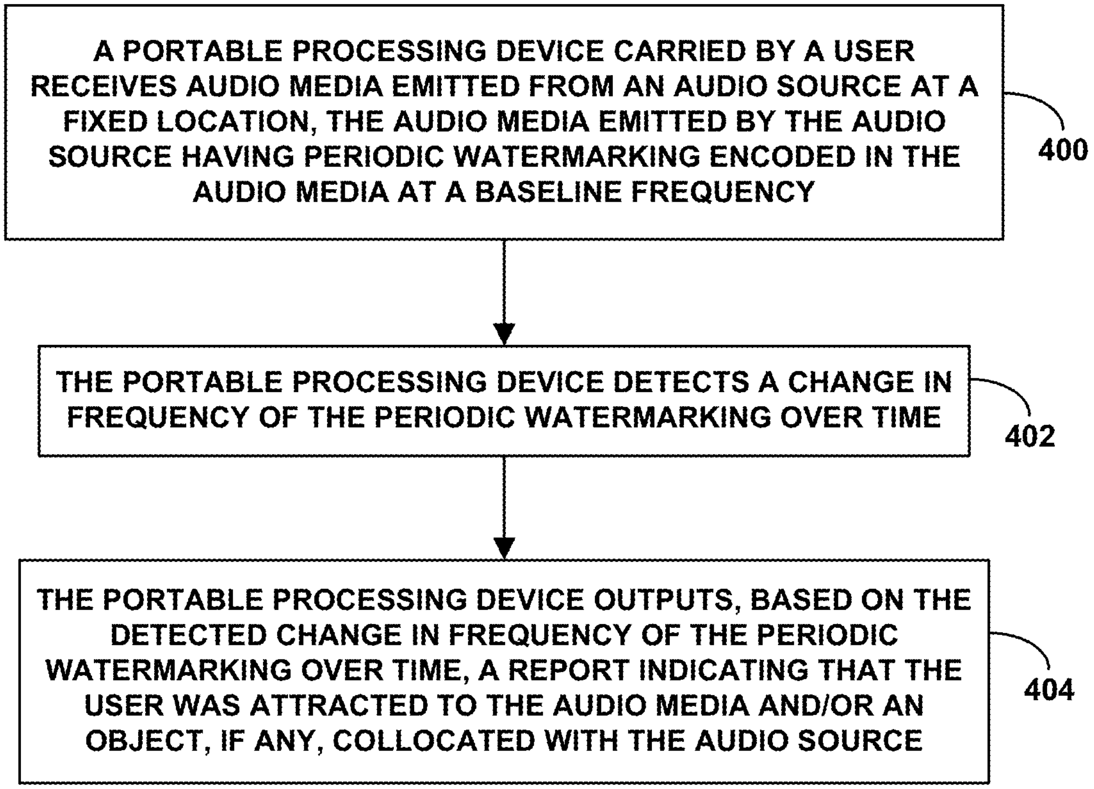
FIG. 4 is a flow chart depicting a method that could be carried out in accordance with the disclosure.

FIG. 4 is next a flow chart illustrating an example method that could be carried out in accordance with the present disclosure, for use of Doppler shift as a basis to detect user focus, such as user attraction to audio media and/or to an object collocated with an audio source for instance. This method could be carried out by a portable processing device such as the portable media-monitoring device described above. Alternatively or additionally, various described operations may be carried out more generally by a computing system including a portable device, possibly further including a separate computing system to which the device reports, among other possibilities.

As shown in FIG. 4, at block 400, the example method includes receiving, into a portable processing device carried by a user, audio media (i.e., audio) emitted from an audio source at a fixed location, wherein the audio media emitted by the audio source has periodic watermarking encoded in the audio media at a baseline frequency. Further, at block 402, the example method includes the portable processing device detecting a change in frequency of the periodic watermarking over time. And at block 404, the example method includes the portable processing device outputting, based on the detected change in frequency of the periodic watermarking over time, a report indicating that the user was attracted to the audio media and/or an object, if any, collocated with the audio source.

As discussed above, if there is an object collocated with the audio source, the object could be a commercial object, and the report could indicate that the user was attracted to the commercial object. Further, the periodic watermarking could indicate identification information associated with the commercial object, in which case the method could additionally include ascertaining the identification information from the periodic watermarking, and having the report indicate that the user was attracted to the commercial object at least in part by indicating the ascertained identification information.

As additionally discussed above, the periodic watermarking could carry identification data that identifies the audio media, in which case the method could additionally include (i) the portable processing device determining, based on the identification data carried by the periodic watermarking, an identity of the audio media and (ii) the portable processing device including, in the report, the determined identity of the audio media.

As further discussed above, the report could indicate that the user was attracted to the audio media and/or object at least in part by indicating that the portable processing device, carried by the user, was attracted to the audio media and/or object.

Further, as discussed above, the act of detecting the change in frequency of the periodic watermarking over time could involve detecting the frequency of the periodic watermarking progressively from at least (a) being higher than the baseline frequency to (b) being the baseline frequency for at least a predefined threshold period of time.

Still further, the predefined threshold period of time could be considered a first threshold period of time, and the act of detecting the frequency of the periodic watermarking progressively from at least (a) being higher than the baseline frequency to (b) being the baseline frequency for at least a predefined threshold period of time could involve detecting the frequency of the periodic watermarking progressively from (i) being higher than the baseline frequency to (ii) being lower than the baseline frequency for no more than a second predefined threshold period of time to (iii) being the baseline frequency for at least the first threshold period of time.

Alternatively, as discussed above, the act of detecting the change in frequency of the periodic watermarking over time could involve detecting the frequency of the periodic watermarking progressively from at least (a) being higher than the baseline frequency to (b) being the baseline frequency for at least the predefined threshold period of time to (c) being lower than the baseline frequency.

Further, as noted above, based on Doppler shift, the act of detecting the frequency of the periodic watermarking being the baseline frequency for at least the predefined threshold period of time could indicate that the portable processing device was stationary in relation to the fixed location of the audio source.

Still further, as discussed above, the periodic watermarking being encoded in the audio media at the baseline frequency could involve the periodic watermarking being modulated on the baseline frequency. Alternatively or additionally, as discussed above, the periodic watermarking being encoded in the audio media at the baseline frequency could involve the periodic watermarking occurring in the audio media with a periodicity defining the baseline frequency.

Yet further, as discussed above, the act of outputting the report could involve providing the report to a ratings system, among other possibilities.

As additionally noted above, such a method could be carried out by a portable processing device, which may comprise a microphone configured to receive audio, a processor, non-transitory data storage, and program instructions stored in the non-transitory data storage and executable by the processor to cause the portable processing device to carry out the method operations when the microphone receives audio media emitted from an audio source at a fixed location, wherein the audio media emitted by the audio source has periodic watermarking encoded in the audio media at a baseline frequency.

Various features described above can be carried out in this context as well, and vice versa.

Further, the present disclosure also contemplates a non-transitory computer readable medium that is encoded with, stores, or otherwise embodies program instructions executable by a processing unit to carry out various operations as described above.

Exemplary embodiments have been described above. Those skilled in the art will understand, however, that changes and modifications may be made to these embodiments without departing from the true scope and spirit of the invention.

What is claimed is:

1. A method for use of Doppler shift as a basis to monitor user exposure, the method comprising:
- receiving, into a portable processing device at a user, audio media emitted from an audio source at a fixed location, wherein the audio media emitted by the audio source has periodic watermarking encoded in the audio media at a baseline frequency;
- detecting, by the portable processing device, a change in frequency of the periodic watermarking over time; and
- using the detected change in frequency of the periodic watermarking over time as a basis to evaluate user exposure to at least one item selected from the group consisting of (i) the audio media and (ii) an object collocated with the audio source,
- wherein using the detected change in frequency of the periodic watermarking over time as a basis to evaluate user exposure to the at least one item comprises using the detected change in frequency of the periodic watermarking over time as a basis to determine whether the user (i) progressively approached and moved past the at least one item or rather (ii) approached the at least one item, stayed stationary, and then moved past the at least one item.

2. The method of claim 1, wherein using the detected change in frequency of the periodic watermarking over time as a basis to evaluate user exposure to the at least one item comprises using the detected change in frequency of the periodic watermarking over time as a basis to determine that the user was stationary in relation to the at least one item.

3. The method of claim 1, wherein using the detected change in frequency of the periodic watermarking over time as a basis to evaluate user exposure to the at least one item comprises using the detected change in frequency of the periodic watermarking over time as a basis to determine that the user was attracted to the at least one item.

4. The method of claim 1, wherein the object collocated with the audio source is a commercial object.

5. The method of claim 4, wherein the periodic watermarking indicates identification information associated with the commercial object, the method further comprising ascertaining the identification information from the periodic watermarking.

6. The method of claim 1, wherein the periodic watermarking indicates identification information associated with the audio media, the method further comprising ascertaining an identity of the audio media based on the identification information.

7. The method of claim 1, wherein the periodic watermarking being encoded in the audio media at the baseline frequency comprises the periodic watermarking being modulated on the baseline frequency.

8. The method of claim 1, wherein the periodic watermarking being encoded in the audio media at the baseline frequency comprises the periodic watermarking occurring in the audio media with a periodicity defining the baseline frequency.

9. A portable processing device comprising:
- a microphone configured to receive audio;
- a processor;
- non-transitory data storage; and
- program instructions stored in the non-transitory data storage and executable by the processor to cause the portable processing device to carry out operations when the microphone receives audio media emitted from an audio source at a fixed location, wherein the audio media emitted by the audio source has periodic watermarking encoded in the audio media at a baseline frequency, the operations including:
  - detecting a change in frequency of the periodic watermarking over time, and
  - using the detected change in frequency of the periodic watermarking over time as a basis to evaluate user exposure to at least one item selected from the group consisting of (i) the audio media and (ii) an object collocated with the audio source,
  - wherein using the detected change in frequency of the periodic watermarking over time as a basis to evaluate user exposure to the at least one item comprises using the detected change in frequency of the periodic watermarking over time as a basis to determine whether a user of the portable processing device (i) progressively approached and moved past the at least one item or rather (ii) approached the at least one item, stayed stationary, and then moved past the at least one item.

10. The portable processing device of claim 9, wherein using the detected change in frequency of the periodic watermarking over time as a basis to evaluate user exposure to the at least one item comprises using the detected change in frequency of the periodic watermarking over time as a basis to determine that a user of the portable processing device was stationary in relation to the at least one item.

11. The portable processing device of claim 9, wherein using the detected change in frequency of the periodic watermarking over time as a basis to evaluate user exposure to the at least one item comprises using the detected change in frequency of the periodic watermarking over time as a basis to determine that a user of the portable processing device was attracted to the at least one item.

12. The portable processing device of claim 9, wherein the object collocated with the audio source is a commercial object.

13. The portable processing device of claim 12, wherein the periodic watermarking indicates identification information associated with the commercial object, the operations further including ascertaining the identification information from the periodic watermarking.

14. The portable processing device of claim 9, wherein the periodic watermarking indicates identification information associated with the audio media, the operations further including ascertaining an identity of the audio media based on the identification information.

15. The portable processing device of claim 9, wherein the periodic watermarking being encoded in the audio media at the baseline frequency comprises the periodic watermarking being modulated on the baseline frequency.

16. The portable processing device of claim 9, wherein the periodic watermarking being encoded in the audio media at the baseline frequency comprises the periodic watermarking occurring in the audio media with a periodicity defining the baseline frequency.

17. A non-transitory computer-readable medium embodying instructions executable by a processor in a portable processing device to cause the portable processing device to carry out operations when the portable processing device receives audio media emitted from an audio source at a fixed location, wherein the audio media emitted by the audio source has periodic watermarking encoded in the audio media at a baseline frequency, the operations comprising:

detecting a change in frequency of the periodic watermarking over time, and outputting, based on the detected change in frequency of the periodic watermarking over time, a report indicating that a user of the portable processing device was attracted to at least one item selected from the group consisting of (i) the audio media and (ii) an object collocated with the audio source, wherein using the detected change in frequency of the periodic watermarking over time as a basis to evaluate user exposure to the at least one item comprises using the detected change in frequency of the periodic watermarking over time as a basis to determine whether a user of the portable processing device (i) progressively approached and moved past the at least one item or rather (ii) approached the at least one item, stayed stationary, and then moved past the at least one item.

18. The non-transitory computer-readable medium of claim 17, wherein using the detected change in frequency of the periodic watermarking over time as a basis to evaluate user exposure to the at least one item comprises using the detected change in frequency of the periodic watermarking over time as a basis to determine that the user was stationary in relation to the at least one item.

19. The non-transitory computer-readable medium of claim 17, wherein using the detected change in frequency of the periodic watermarking over time as a basis to evaluate user exposure to the at least one item comprises using the detected change in frequency of the periodic watermarking over time as a basis to determine that the user was attracted to the at least one item.

20. The non-transitory computer-readable medium of claim 17, wherein the periodic watermarking indicates identification information associated with the audio media, the method further comprising ascertaining an identity of the audio media based on the identification information.

* * * * *